United States Patent
Girvin et al.

(10) Patent No.: US 7,286,055 B2
(45) Date of Patent: Oct. 23, 2007

(54) TAMPER-RESISTANT RFID DISABLING APPARATUS

(75) Inventors: Joshua M. Girvin, Indialantic, FL (US); John W. Lerch, Indialantic, FL (US)

(73) Assignee: Proximities, Inc., Melbourne, FL (US)

( * ) Notice: Subject to any disclaimer, the term of this patent is extended or adjusted under 35 U.S.C. 154(b) by 163 days.

(21) Appl. No.: 11/068,728

(22) Filed: Feb. 28, 2005

(65) Prior Publication Data

US 2006/0202829 A1 Sep. 14, 2006

(51) Int. Cl.
*G08B 13/14* (2006.01)

(52) U.S. Cl. .............. 340/572.3; 340/572.7; 340/572.8; 340/572.9

(58) Field of Classification Search ............ None
See application file for complete search history.

(56) References Cited

U.S. PATENT DOCUMENTS

| | | | |
|---|---|---|---|
| D253,258 S * | 10/1979 | Clark | D2/638 |
| 4,272,900 A * | 6/1981 | MacLarty et al. | 40/665 |
| 4,318,234 A * | 3/1982 | Charles et al. | 40/665 |
| 4,914,843 A * | 4/1990 | DeWoskin | 40/633 |
| 5,092,067 A * | 3/1992 | Prout | 40/633 |
| 5,448,846 A | 9/1995 | Peterson et al. | |
| 5,457,906 A | 10/1995 | Mosher, Jr. | |
| 5,499,468 A * | 3/1996 | Henry | 40/633 |
| 5,512,879 A * | 4/1996 | Stokes | 340/573.4 |
| 5,581,924 A * | 12/1996 | Peterson | 40/633 |
| 5,873,188 A * | 2/1999 | Gehris | 40/633 |
| 5,883,576 A | 3/1999 | De La Huega | |
| 5,973,598 A | 10/1999 | Beigel | |
| 5,973,600 A | 10/1999 | Mosher, Jr. | |
| 5,979,941 A | 11/1999 | Mosher, Jr. et al. | |
| 6,043,746 A | 3/2000 | Sorrells | |
| 6,050,622 A | 4/2000 | Gustafson | |
| 6,055,756 A * | 5/2000 | Aoki | 40/633 |
| 6,058,637 A * | 5/2000 | Duncan | 40/633 |
| 6,079,135 A * | 6/2000 | Ruiz | 40/316 |
| 6,092,321 A * | 7/2000 | Cheng | 40/633 |
| 6,236,319 B1 | 5/2001 | Pitzer et al. | |
| 6,255,951 B1 | 7/2001 | De La Huega | |
| 6,346,886 B1 | 2/2002 | De La Huega | |
| 6,392,543 B2 * | 5/2002 | Maloney | 340/568.1 |
| 6,421,013 B1 | 7/2002 | Chung | |
| 6,782,648 B1 | 8/2004 | Mosher, Jr. | |
| 6,888,509 B2 | 5/2005 | Atherton | |
| 6,933,844 B2 * | 8/2005 | Augspurger et al. | 340/545.1 |
| 6,958,677 B1 * | 10/2005 | Carter | 340/10.1 |
| 2002/0067264 A1 | 6/2002 | Soehnlen | |
| 2002/0084904 A1 | 7/2002 | De La Huega | |
| 2003/0075608 A1 | 4/2003 | Atherton | |
| 2003/0173408 A1 | 9/2003 | Mosher | |

(Continued)

*Primary Examiner*—Benjamin C. Lee
(74) *Attorney, Agent, or Firm*—Hamilton, Brook, Smith & Reynolds, P.C.

(57) ABSTRACT

A tamper-resistant RFID identification apparatus that includes a mechanism for storing an excess portion of the apparatus when engaged. The apparatus includes a substrate including a series of holes along a length thereof and a slot distal from the series of holes, a tamper-resistant locking mechanism for securing the apparatus to an object, an RFID circuit disposed on the substrate and an electrically conductive loop disposed on the substrate and electrically coupled to the RFID circuit, that is arranged to disable the RFID circuit when cut. The slot receives a tail portion of the substrate when the apparatus is secured.

15 Claims, 4 Drawing Sheets

U.S. PATENT DOCUMENTS

2004/0066296 A1    4/2004  Atherton
2004/0237367 A1*  12/2004  Ali .............................. 40/633
2005/0262746 A1* 12/2005  Ali et al. ...................... 40/633
2005/0279001 A1* 12/2005  Riley ........................... 40/633
2006/0143961 A1*  7/2006  Riley ........................... 40/633

* cited by examiner

TAMPER-RESISTANT RFID DISABLING APPARATUS

BACKGROUND OF THE INVENTION

Bracelets have been used for such things as identification, access control, and age verification for a number of years. For example, various venues may use identification bracelets to quickly and uniquely identify patrons that have access to restricted areas, such as back stage events, alcoholic beverage sales, etc. These bracelets can be made using a narrow band of plastic or other suitable material, so that they are inexpensive to produce and easy to use. However, such bracelets are susceptible to misuse and unauthorized use. Some bracelets are easy to remove, yet still function after removal. A bracelet that still serves its purpose after it has been removed provides the opportunity for patrons to exchange and or sell bracelets. This could provide patrons with the opportunity to give access to a restricted area to an unauthorized patron. For example, a patron with an "adult" bracelet that allows access to alcoholic beverage sales could be removed and given or sold to a patron not of legal drinking age.

Mechanical measures have been taken to prevent such bracelets from being transferred. Most prominent is the use of a single-use locking mechanism found on some plastic bracelets. Once the locking mechanism is engaged, an excess portion or tail of the bracelet extends outward from the locking mechanism. To enhance the capabilities of these bracelets, RFID transponder circuitry has been integrated into these bracelets. Some have suggested the RFID transponder circuitry be redesigned to include disabling technologies, such as tamper wires running along the length of the bracelet. The tamper wires are arranged to disable the RFID circuitry when cut. In some implementations, the tamper wires run along substantially the entire length thereof. These disabling technologies render the RFID circuitry inoperable should the bracelet be tampered with or cut, since a cut in the bracelet necessarily also cuts the tamper wire.

SUMMARY OF THE INVENTION

While these disabling RFID wristbands work well electrically, there is a practical problem with their use. When such bracelets are secured to the wrist or other part of a person, the extra tail end piece becomes a nuisance to the wearer, as it may very well interfere with clothing and/or otherwise cause irritation. The excess band can also interfere with daily activities and movements, such as dining and participating in athletic activities. As such, either the wearer or the person administering the bracelet typically cuts or tears the tail portion from the bracelet.

While cutting of the extra tail piece has become the custom with simple, non-disabling RFID wristbands, in the case of a bracelet having a disabling wire embedded in the band, this causes a problem, since cutting the tail end of the band will cause the RFID circuit to stop functioning.

Although cutting extra tail piece has become the custom, others have tried to create an adhesive region at the end of the excess band that can then be used to adhere the end of the excess band back to the band itself. However, there are several drawbacks to this approach, such as cost of the band, design complexity of the band, and adhesion of the adhesive bond over time. That is, adhesives tend to become weaker over time with exposure to the elements and physical stress. Therefore, the adhesive bond is likely to fail in active environments such as resorts, water parks, concerts, and other entertainment venues where such bracelets would likely be used. If the bond should come apart, the efficacy of the adhesive in reattaching the bond is drastically reduced.

Others have also attempted to fold back the additional tail piece and reattach it to the band. This is sometimes done with non-RFID bracelets under circumstances where scissors are not available, even though no circuitry is attached to the bracelet. Commonly, this is done by attaching the excess band back to the band through the single-use locking mechanism. This has two primary drawbacks. First, folding back the excess band leaves a loop of material protruding from the bracelet. This may be less of a nuisance for the wearer, but still can interfere with the wearer's movement and comfort. Second, folding back the excess band creates a region where the probability of a crease becoming formed in the band is greatly increased. Consequently, the tamper wire that runs past this fold is exposed to more stress than circuitry in other areas of the band. As such, folding the excess band back for reattachment makes the apparatus vulnerable to premature failure in the field.

A tamper-resistant RFID identification apparatus is provided that includes a mechanism for storing an excess portion of the apparatus, such as the aforementioned tail end piece, while the bracelet is engaged to the user. The apparatus includes a substrate, an RFID circuit disposed on the substrate, a mechanism for disabling the RFID circuit when the substrate is severed, a tamper-resistant locking mechanism for securing the apparatus to an object, and a slot located in the substrate to receive a tail portion of the substrate. The mechanism for disabling the RFID circuit can be an electrically conductive loop disposed on the substrate and coupled to the RFID circuit. The electrically conductive loop can preferably runs along the entire length of the substrate.

The substrate can include a series of holes along a length thereof. The locking mechanism can include a peg located at one end of the substrate and a locking hole located the same end of the substrate, the peg and the locking hole cooperatively and securely engaging one another to securely engage one hole of the substrate. The engagement of the locking mechanism can create a tail portion of the substrate. The invention is applicable in any situation where closure of the fastening mechanism produces excess material that is not secured to the band. The slot is positioned to slidably accept the excess tail portion of the substrate, thus enabling a person to comfortably wear the bracelet without destroying RFID functionality by cutting the excess band, degrading the durability of the apparatus by folding it over, or the like.

The slot can also be designed and positioned to create a frangible zone in the substrate, such that an attempt to remove the band from an object by applying force along the length of the band will tend to cause breakage at that frangible zone where the slot is located. The slot can be located in an area of the substrate so as not to interfere with viewing of indicia on a surface of the substrate.

The RFID circuit can include a loop antenna and an RFID transponder chip. The slot can form a frangible zone in the substrate such that the loop antenna is severed upon breakage in the frangible zone. The slot can be surrounded by the loop antenna.

The present invention has the distinct advantage for storing an excess portion of a disabling RFID apparatus. This advantage removes the annoyances associated with the excess portion of the apparatus.

BRIEF DESCRIPTION OF THE DRAWINGS

The foregoing and other objects, features and advantages of the invention will be apparent from the following more particular description of preferred embodiments of the invention, as illustrated in the accompanying drawings in that like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Generally, passive radio frequency identification (RFID) bracelets include transponder circuits containing an antenna and other additional circuitry that respond to an RF interrogation signal. The additional circuitry is typically provided as a single integrated circuit transponder chip. However, other embodiments are possible, including, for example, an integrated circuit transponder chip incorporated with an external capacitor. In response to the RF interrogation signal, the transponder emits an RF signal representative of information pre-stored or pre-programmed into the transponder. For example, the information could include a serial number, the date the bracelet is issued, the date the bracelet expires and will no longer be usable for access, the age status of the wearer, and/or whether the bracelet can be used for purchasing goods or services. Any other desired information, depending on the context in that the bracelet is to be used, may be stored or programmed in the transponder. Information stored on the transponder chip may also be used to access information stored in a database.

The antenna is typically formed as a wire coil. The transponder chip is electrically connected to the antenna and derives power from the RF signal received by the antenna.

In addition, a connection is made between the antenna and the transponder chip in the form of a continuous electrically conductive loop that extends around the bracelet. The conductive loop serves a disabling function such that severance of any portion of the bracelet also severs the conductive loop, thus rendering the RFID function of the bracelet inoperable.

Figure 1:
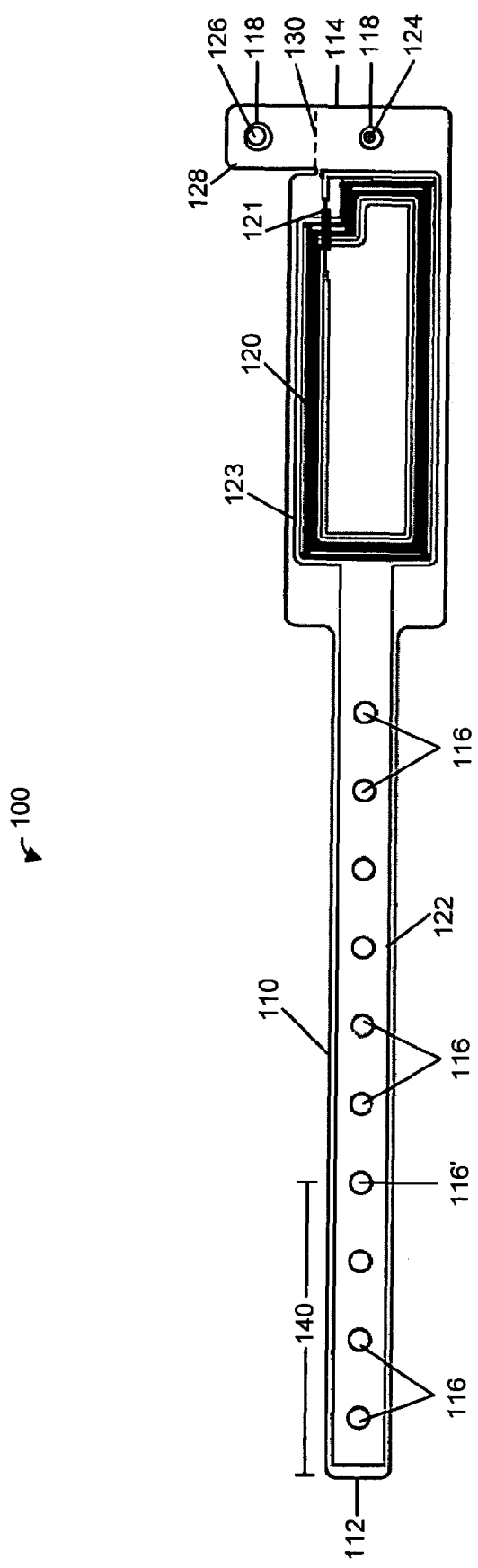
FIG. 1 shows a plan view of a Radio Frequency Identification (RFID) bracelet using a single use locking-hole mechanism.

FIG. 1 is a general illustration of a disabling RFID bracelet 100 using a single use locking-hole mechanism. The bracelet 100 is generally an elongated substrate 110 with opposite ends 112, 114 that can be brought together and fastened to form a closed loop. The substrate 110 includes a plurality of adjustment holes 116, a single-use locking mechanism 118, and an RFID transponder circuit 120 including a conductive loop 122. The RFID transponder circuit includes an RFID transponder chip 121 and an antenna 123. The antenna 123 can be a coiled loop antenna.

The conductive loop (tamper or disabling wire) 122 runs about the length of the substrate 110. The RFID circuit 120 will be rendered inoperative and the bracelet 100 rendered unusable if the conductive loop 122 is broken or severed. The single-use locking mechanism 118 is a mechanical non-reusable tamper-resistant locking mechanism. For example, the single-use locking mechanism 118 is preferably a barbed peg 124 and locking hole 126 in a flap 128. The single-use locking mechanism 118 is preferably used to fasten the opposite ends 112, 114 together under the flap 128 to form the closed loop as will be explained in more detail below.

The adjustment holes 116 are used to adjust the bracelet 100 to conform to body parts of different circumferences, e.g. a wrist or an ankle. When the opposite ends 112, 114 of the substrate 110 are brought together, the barbed peg 124 is inserted through a selected hole 116 (e.g. 116') as required for a snug fit. The flap 128 is then folded along an imaginary line 130 and the barbed peg 124 is then passed through the locking hole 126. The barbed peg 124 is shaped to resist removal from the locking hole 126 without destroying the locking mechanism 118.

In this configuration, the end 112 extending beyond the selected hole 116' creates a tail portion 140. Removal of the tail portion 140 necessarily severs the conductive loop 122 thereby rendering the RFID circuit 120 inoperable.

Figure 2A:
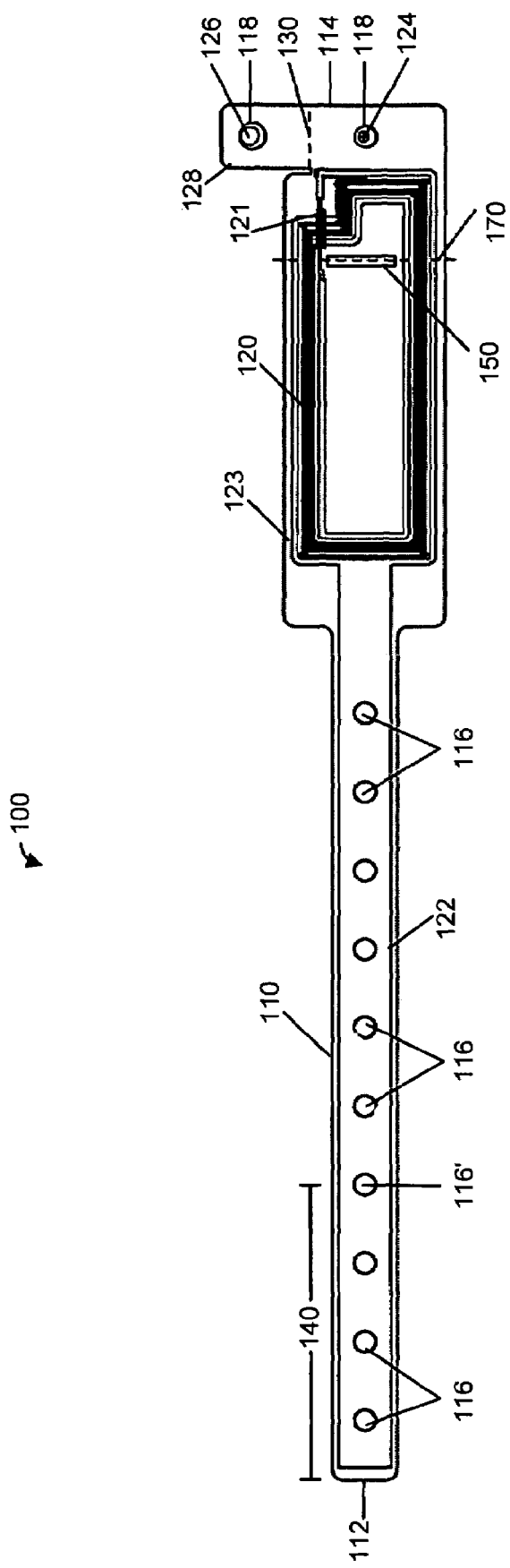
FIG. 2A shows a plan view of a modified RFID bracelet of FIG. 1.

FIG. 2A shows a plan view of a modified RFID bracelet of FIG. 1 by way of example only. It should be understood that any type of locking mechanism that creates a tail portion can be used. The bracelet 100 includes a slot 150 for slidably accepting the tail portion 140 of the substrate 110. In this way, the tail portion 140 of the substrate can be stored under the substrate 110 without being an annoyance to the wearer. The slot 150 can be located in close proximity to the RFID circuitry 120 (i.e. surrounding the antenna 123) creating a frangible zone in the substrate 110 such that force applied to substrate 110 in a lengthwise direction would likely cause a break along an imaginary line 170. Imaginary line 170 is the preferred location for the substrate 110 to break because it necessarily severs a number of coils in the loop antenna 123. The breaking of numerous coils makes the antenna 123 nearly impossible to repair, since each coil needs to be reconnected and repositioned precisely where it was before the severing. In one embodiment, a slot (i.e., slit) can be made in the substrate of an existing disabling RFID bracelet, such as the one depicted in FIG. 1, to provide the same storage function as the slot 150 described above.

Figure 2B:
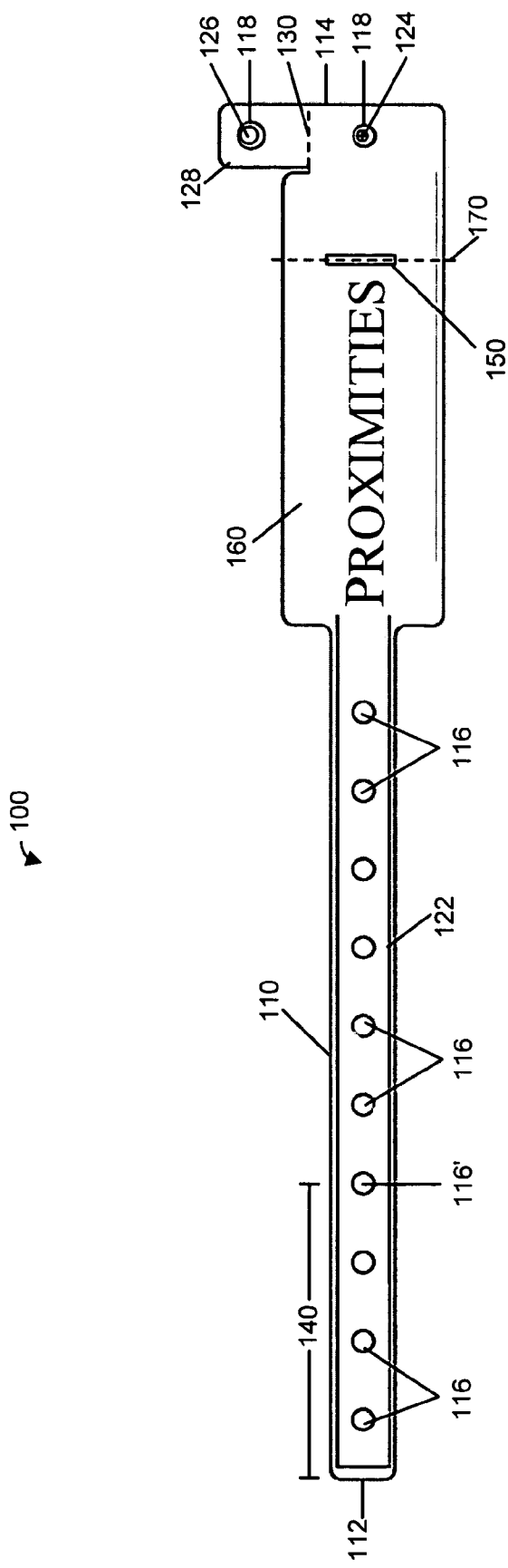
FIG. 2B shows a plan view of a viewing surface of the bracelet of FIG. 2A.

FIG. 2B shows a plan view of a viewing indicia surface 160 of the bracelet of FIG. 2A. The viewing surface 160 can contain indicia, such as sponsorship logos, advertisements, event names, and the like. The slot 150 and/or slit should be positioned on the substrate 110 so as to not interfere with the viewing surface 160 of the substrate 110.

Figure 2C:
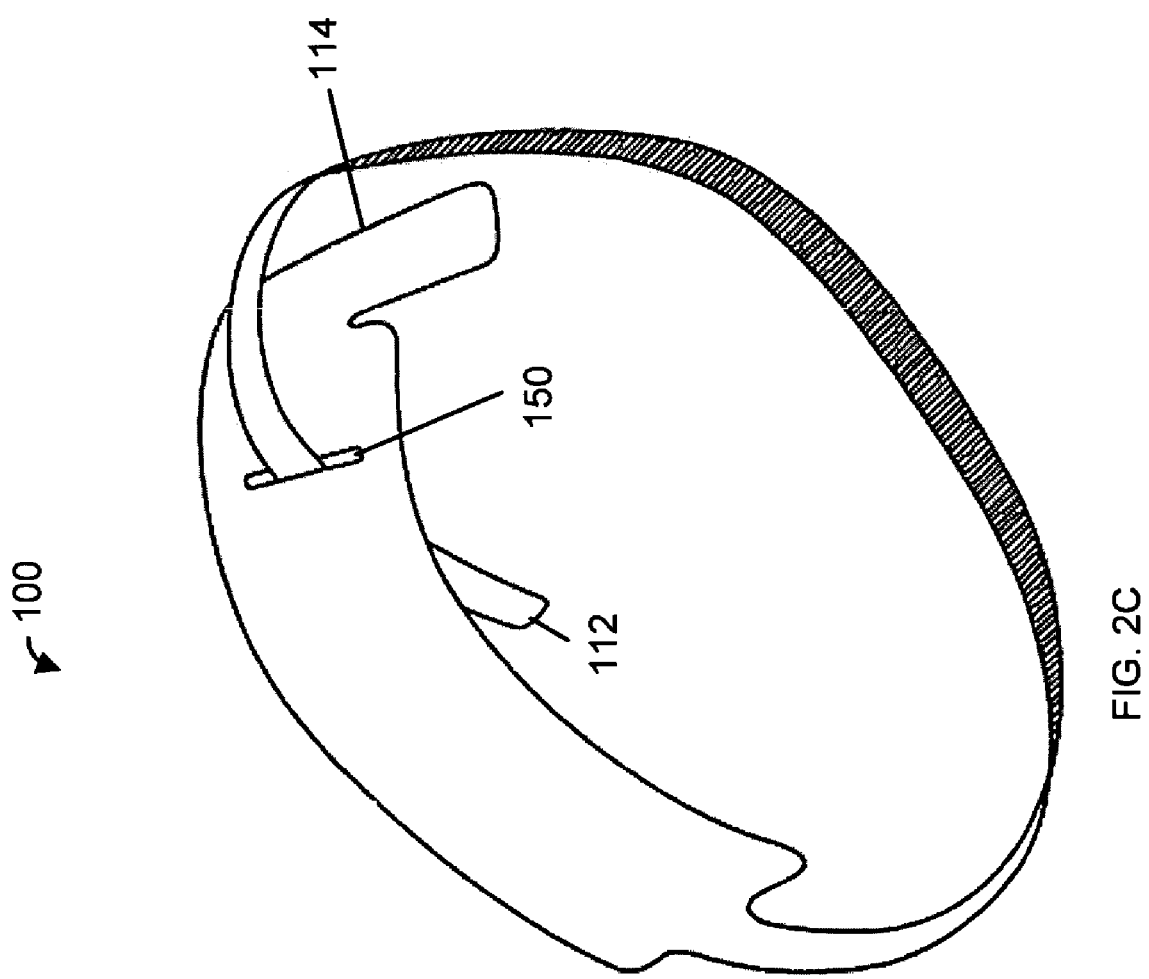
FIG. 2C shows a perspective engaged view of the FIGS. 2A and 2B.

FIG. 2C shows a perspective view of the bracelet 100 of FIGS. 2A and 2B. As shown, the opposite end 112 is slid through the slot 150 of the substrate 110 while the bracelet 100 is attached to a wearer or object. As such, the annoyances associated with the excess (tail) portion of the bracelet 100 are eliminated.

While this invention has been particularly shown and described with references to preferred embodiments thereof, it will be understood by those skilled in the art that various changes in form and details may be made therein without departing from the scope of the invention encompassed by the appended claims. For example, the slot can be made on any locking bracelet that creates a tail portion and is not limited to RFID bracelets.

What is claimed is:

1. A tamper-resistant RFID identification apparatus, comprising:

a substrate;

an RFID circuit disposed on the substrate;

a mechanism extending through at least a tail portion of the substrate for disabling the RFID circuit when the mechanism is severed;

a tamper-resistant locking mechanism for securing the apparatus to an object; and a slot located in the substrate to receive and restrain the tail portion of the substrate;

wherein the substrate includes a series of holes along a length thereof; and wherein the locking mechanism includes: a peg located at one end of the substrate; and a locking hole located the same end of the substrate, the peg and the locking hole cooperatively and securely attach to one another to securely engage one hole of the substrate.

2. The apparatus of claim 1, wherein the RFID circuit is located in close proximity to the slot.

3. The apparatus of claim 1, wherein the slot is located in an area of the substrate as not to interfere with viewing of indicia on a surface of the substrate.

4. The apparatus of claim 1, wherein the slot forms a frangible zone in the substrate.

5. The apparatus of claim 1, wherein the RFID circuit includes a loop antenna and an RFID transponder chip.

6. The apparatus of claim 5, wherein the slot forms a frangible zone in the substrate such that at least a portion of the loop antenna is severed upon a break in the frangible zone.

7. The apparatus of claim 5, wherein the slot is surrounded by at least a portion of the loop antenna.

8. The apparatus of claim 1, wherein the mechanism for disabling the RFID circuit includes an electrically conductive loop disposed on the substrate and electrically coupled to the RFID circuit.

9. The apparatus of claim 8, wherein the electrically conductive loop runs along substantially the entire length of the substrate.

10. The apparatus of claim 1, wherein the slot is formed after production of the RFID identification apparatus.

11. The apparatus of claim 1, wherein the slot is located in close proximity to the locking mechanism.

12. A method of adapting a tamper-resistant RFID identification apparatus, comprising: cutting a slot in a proximal end of a substrate of the apparatus to slidably accept and restrain a tail portion of a distal end of the substrate; wherein the apparatus includes:

a tamper-resistant locking mechanism for securing the apparatus to an object;

an RFID circuit disposed on the substrate; and a mechanism extending through at least the tail portion of the substrate for disabling the RFID circuit when the mechanism is severed;

wherein the substrate includes a series of holes along a length thereof; and wherein the locking mechanism includes: a peg located at one end of the substrate; and a locking hole located the same end of the substrate, the peg and the locking hole cooperatively and securely attach to one another to securely engage one hole of the substrate.

13. The method of claim 12, wherein the mechanism for disabling the RFID circuit includes an electrically conductive loop disposed on the substrate and coupled to the RFID circuit.

14. The method of claim 13, wherein the electrically conductive loop runs along substantially the entire length of the substrate.

15. A tamper-resistant RFID identification apparatus, comprising:

a substrate;

an RFID circuit disposed on the substrate;

a mechanism extending through at least a tail portion of the substrate for disabling the RFID circuit when the mechanism is severed; and a slot located in the substrate to receive and restrain the tail portion of the substrate; and wherein the substrate includes a series of holes along a length thereof cooperating with a locking mechanism; and wherein the locking mechanism includes: a peg located at one end of the substrate; and a locking hole located the same end of the substrate, the peg and the locking hole cooperatively and securely attach to one another to securely engage one hole of the substrate.

* * * * *